US012156621B2

(12) United States Patent
Cai et al.

(10) Patent No.: US 12,156,621 B2
(45) Date of Patent: Dec. 3, 2024

(54) METHOD FOR CLEANING MOP OF CLEANING ROBOT AND MAINTENANCE STATION

(71) Applicant: SHENZHEN FLY RODENT DYNAMICS INTELLIGENT TECHNOLOGY CO., LTD., Shenzhen (CN)

(72) Inventors: Yongting Cai, Shenzhen (CN); Zicheng Xu, Shenzhen (CN); Zhenhua Wen, Shenzhen (CN); Ziyun Cheng, Shenzhen (CN)

(73) Assignee: SHENZHEN FLY RODENT DYNAMICS INTELLIGENT TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/548,784

(22) Filed: Dec. 13, 2021

(65) Prior Publication Data

US 2022/0304538 A1 Sep. 29, 2022

(30) Foreign Application Priority Data

Mar. 25, 2021 (CN) ......................... 202110322508.3

(51) Int. Cl.
*B08B 1/50* (2024.01)
*A47L 11/28* (2006.01)
(Continued)

(52) U.S. Cl.
CPC ........... *A47L 11/4091* (2013.01); *A47L 11/28* (2013.01); *A47L 11/4011* (2013.01);
(Continued)

(58) Field of Classification Search
CPC .. A47L 11/4091; A47L 11/28; A47L 11/4011; A47L 11/4036; A47L 2201/028;
(Continued)

(56) References Cited

U.S. PATENT DOCUMENTS

2009/0281661 A1* 11/2009 Dooley ............... B60L 15/2036 901/1
2014/0166047 A1* 6/2014 Hillen ....................... A47L 9/30 15/49.1
(Continued)

FOREIGN PATENT DOCUMENTS

CN 110565324 A 12/2019
CN 111358342 A 7/2020
(Continued)

OTHER PUBLICATIONS

Machine translation of KR-940010289-B1 (Year: 1994).*
International Search Report of PCT Patent Application No. PCT/CN2021/135569 issued on Feb. 25, 2022.

*Primary Examiner* — Erin F Bergner
(74) *Attorney, Agent, or Firm* — Samson G. Yu

(57) ABSTRACT

A method for cleaning the mop of a cleaning robot includes: obtaining mop usage information after the cleaning robot carries the mop to clean the floor, and selecting a target mop cleaning mode to clean the mop according to the mop usage information.

6 Claims, 6 Drawing Sheets

(51) Int. Cl.

| | |
|---|---|
| ***A47L 11/40*** | (2006.01) |
| ***B08B 3/08*** | (2006.01) |
| ***B08B 13/00*** | (2006.01) |

(52) U.S. Cl.

CPC ............ *A47L 11/4036* (2013.01); *B08B 1/50* (2024.01); *B08B 3/08* (2013.01); *B08B 13/00* (2013.01); *A47L 2201/028* (2013.01)

(58) Field of Classification Search

CPC .......................... A47L 11/282; A47L 11/4005; A47L 11/4008; A47L 2201/00; A47L 2201/06; B08B 1/007; B08B 3/08; B08B 13/00

See application file for complete search history.

(56) References Cited

U.S. PATENT DOCUMENTS

| | | | | |
|---|---|---|---|---|
| 2014/0207280 | A1 * | 7/2014 | Duffley | A47L 9/2857 700/257 |
| 2017/0049288 | A1 * | 2/2017 | Knutson | A47L 11/4083 |
| 2020/0077858 | A1 | 3/2020 | Zhang et al. | |
| 2021/0338034 | A1 | 11/2021 | Wu et al. | |
| 2022/0296069 | A1 * | 9/2022 | Wang | A47L 11/28 |

FOREIGN PATENT DOCUMENTS

| | | | | |
|---|---|---|---|---|
| CN | 111743477 | A | | 10/2020 |
| CN | 111789538 | A | | 10/2020 |
| CN | 112006618 | A | | 12/2020 |
| CN | 112515577 | A | | 3/2021 |
| DE | 102019213088 | B3 | | 2/2021 |
| KR | 940010289 | B1 | * | 10/1994 |
| WO | 2021020930 | A1 | | 2/2021 |

* cited by examiner

METHOD FOR CLEANING MOP OF CLEANING ROBOT AND MAINTENANCE STATION

CROSS-REFERENCE TO RELATED APPLICATIONS

The present disclosure claims priority of Chinese Patent Application No. 202110322508.3, filed on Mar. 25, 2021, titled "METHOD FOR CLEANING MOP OF CLEANING ROBOT AND MAINTENANCE STATION", the contents of which are incorporated herein by reference.

TECHNICAL FIELD

The present disclosure relates to the field of smart homes, and in particular, relates to a method for cleaning the mop of a cleaning robot and a maintenance station.

BACKGROUND

With the development of cleaning robot technology, cleaning robots have gradually entered ordinary families, and they gradually liberate people from heavy and trivial housework, thus providing great convenience for people.

A typical cleaning robot has the function of mopping the floor, and the robot may carry a mop to mop the floor. When cleaning the mop, the cleaning robot may carry the mop and move to the cleaning tank of a maintenance station that has been set indoors. The mop on the robot rotates by itself, or the mop is rubbed by a roller brush, a scraper and other parts located on the maintenance station. Meanwhile, the mop is wetted and washed by a water spraying mechanism in the maintenance station, thereby achieving the purpose of cleaning the mop.

A typical maintenance station usually does not distinguish the material or dirty degree of the mop when cleaning the mop, and adopt a fixed cleaning mode to clean the mop. When the cleaning strength is high and the mop material is soft, the maintenance station will damage the mop and shorten the service life thereof. Alternatively, when the mop is dirty and the cleaning time is short, the mop cannot be cleaned well, which results in secondary pollution when the cleaning robot carries the mop to perform subsequent cleaning operations.

SUMMARY

An embodiment of the present disclosure provides a method for cleaning the mop of a cleaning robot. The method includes: obtaining mop usage information after the cleaning robot carries the mop to clean the floor, and selecting a target mop cleaning mode to clean the mop according to the mop usage information.

BRIEF DESCRIPTION OF THE DRAWINGS

One or more embodiments are illustrated by pictures in corresponding attached drawings, and this does not constitute limitation of the embodiments. Elements labeled with the same reference numerals in the attached drawings represent similar elements, and unless otherwise stated, figures in the attached drawings do not constitute scale limitation.

DETAILED DESCRIPTION

In order to make objects, technical solutions and advantages of the present disclosure clearer, the present disclosure will be further described in detail with reference to attached drawings and embodiments. It shall be appreciated that, the specific embodiments described herein are only used to explain the present disclosure, and are not used to limit the present disclosure. Based on the embodiments of the present disclosure, all other embodiments obtained by those of ordinary skill in the art without creative labor belong to the scope claimed in the present disclosure.

It shall be noted that, all features in the embodiments of the present disclosure can be combined with each other if there is no conflict, and this is within the scope claimed in the present disclosure. In addition, although functional modules are divided in the schematic diagrams of the device and logical sequences are shown in the flowchart diagrams, in some cases, the steps shown or described can be performed in module division and sequences different from those in the schematic diagrams and flowchart diagrams. Furthermore, words such as "first", "second" and "third" used in the present disclosure do not limit the data and execution order, but only distinguish same or similar items with basically the same functions and effects.

Figure 1:
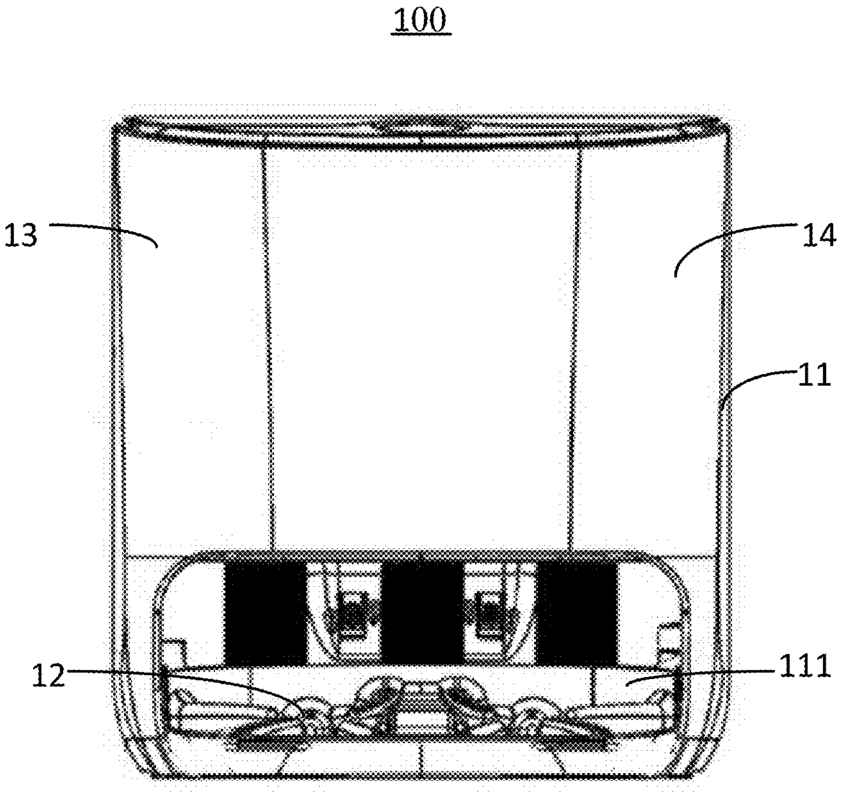
FIG. 1 is a front view of a maintenance station provided by an embodiment of the present disclosure.
Figure 2:
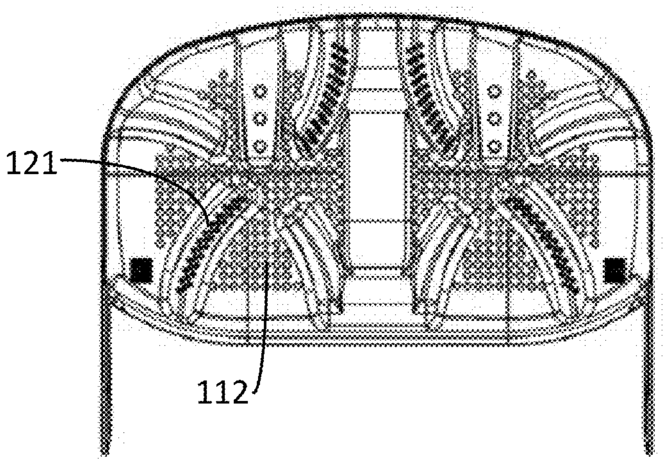
FIG. 2 is a schematic view of a cleaning assembly shown in FIG. 1 installed in a cleaning tank.

An embodiment of the present disclosure relates to a maintenance station. The maintenance station has mop cleaning function, and at least one of power supply function, mop drying function and dust collection function, accordingly, the maintenance station is capable of cleaning the mop of the cleaning robot, providing power for the cleaning robot, blowing and drying the mop or collecting garbage from a dust box. Referring to FIG. 1 and FIG. 2, the maintenance station 100 includes a housing 11, a cleaning assembly 12, a clean liquid supply assembly 13 and a waste liquid collection assembly 14.

The housing 11 is used for accommodating the above assemblies, wherein the housing 11 may be constructed in any suitable shape. In some embodiments, as shown in FIG. 1, the housing 11 is generally cylindrical.

As shown in FIG. 1, the bottom part of the housing 11 is provided with an accommodating cavity 111 into which the cleaning robot may move. The width of the accommodating cavity 111 is larger than the width of the robot and the height thereof is larger than the thickness of the cleaning robot in order to make it convenient for the cleaning robot to enter the accommodating cavity 111.

The cleaning assembly 12 is installed in the accommodating cavity 111 for cleaning the mop carried by the cleaning robot. In some embodiments, the mop includes other objects of suitable materials and shapes, such as a mop or a sponge. The mop is detachably mounted at the bottom part of the cleaning robot, and the cleaning robot may control the rotation of the mop.

In some embodiments, the cleaning assembly 12 includes a rubbing part 121, the bottom part of the accommodating cavity 111 is provided with one or more cleaning groove 112, and the shape of the cleaning groove 112 matches with the shape of the mop to avoid the splashing of cleaning liquid when cleaning the mop. Furthermore, the number of the cleaning groove 112 corresponds to the number of mops of the cleaning robot. As shown in FIG. 2, there are two cleaning grooves 112, and accordingly, the cleaning robot may carry two mops to mop the floor.

The rubbing part 121 is arranged above the cleaning groove 112. When the cleaning robot carries the mop and places it in the cleaning groove 112, and the cleaning robot drives the mop to rotate in the cleaning groove 112, the rubbing part 121 is in frictional contact with the mop, the rubbing part 121 may rub off large pieces of garbage and dust carried by the mop. In addition, when the mop is sprayed with water in the cleaning groove 112, on the one hand, the mop is sprayed with water and wetted, and on the other hand, the rubbing part 121 rubs against the mop to squeeze out the water in the mop, thereby achieving a better effect of cleaning the mop.

A liquid inlet part is configured to transfer the clean liquid from the clean liquid supply assembly 13 to the cleaning groove 112. In some embodiments, the liquid inlet part is a liquid inlet pipe.

A liquid discharge part is configured to discharge the waste liquid from the cleaning groove 112 to a waste liquid collection assembly 14. In some embodiments, the liquid discharge part is a liquid discharge pipe.

The clean liquid supply assembly 13 is installed in the housing 11 for supplying clean liquid.

Figure 3:
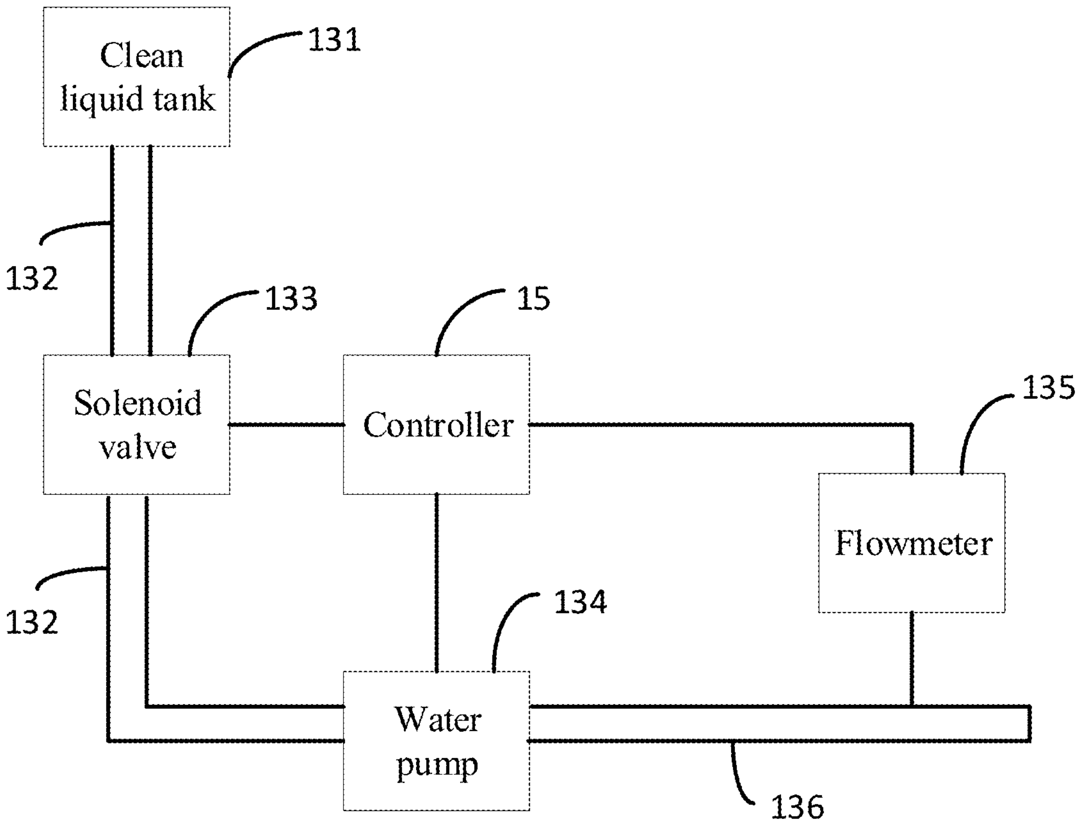
FIG. 3 is a schematic structural diagram of a clean liquid supply assembly in the maintenance station shown in FIG. 1.

In some embodiments, referring to FIG. 3, the maintenance station 100 further includes a controller 15, and the clean liquid supply assembly 13 includes a clear liquid tank 131, a first liquid supply pipe 132, a solenoid valve 133, a water pump 134, a flowmeter 135 and a second liquid supply pipe 136.

The controller 15, as the control core of the clean liquid supply assembly 13, is used to control the working state of the clean liquid supply assembly 13.

The clear liquid tank 131 is used for storing liquid. The liquid here may be clean water or cleaning liquid containing chemical detergent components. The clear liquid tank 131 is arranged at the upper part of the housing 11, and is provided with a liquid outlet. One end of the first liquid supply pipe 132 communicates with the liquid outlet, and the other end thereof communicates with an input end of the water pump 134.

The solenoid valve 133 is installed on the first liquid supply pipe 132 and is configured to control the outflow of liquid. The solenoid valve 133 is electrically connected with the controller 15, the controller 15 may send an opening instruction or a closing instruction to the solenoid valve 133, and the solenoid valve 133 works in an open state or a closed state according to the opening instruction or the closing instruction. When the solenoid valve 133 is in an open state, the liquid in the clear liquid tank 131 may flow through the solenoid valve 133, and when the solenoid valve 133 is in a closed state, the liquid in the clear liquid tank 131 is blocked by the solenoid valve 133.

The input end of the water pump 134 communicates with the other end of the first liquid supply pipe 132, the output end of the water pump 134 communicates with one end of the second liquid supply pipe 136, and the other end of the second liquid supply pipe 136 communicates with the liquid inlet part of the cleaning assembly 12. The water pump 134 pumps out the liquid and sprays it to the mop of the cleaning robot through the liquid inlet part so as to clean the mop. The controller 15 is electrically connected with the water pump 134, and it may adjust the driving power of the water pump 134, thereby changing the cleaning strength when cleaning the mop.

The flowmeter 135 is installed on the second liquid supply pipe 136, and is used for detecting the unit flow of the adding liquid flowing through the second liquid supply pipe 136.

The controller 15 is electrically connected with the water pump 134 and the flowmeter 135, and the controller 15 is configured to control the working state of the water pump 134. When the maintenance station 100 is used to add liquid to the cleaning robot, first, the controller 15 controls the solenoid valve 133 to work in an open state, and controls the water pump 134 to pump liquid from the clear liquid tank 131 so that the liquid is sprayed to the mop of the cleaning robot through the liquid inlet part of the cleaning assembly 12. At the same time, the flowmeter 135 may detect the unit flow of the adding liquid supplied to the clear liquid tank.

The waste liquid collection assembly 14 is installed in the housing 11, and is arranged side by side with the clean liquid supply assembly 13, and is used for extracting waste liquid.

Figure 4:
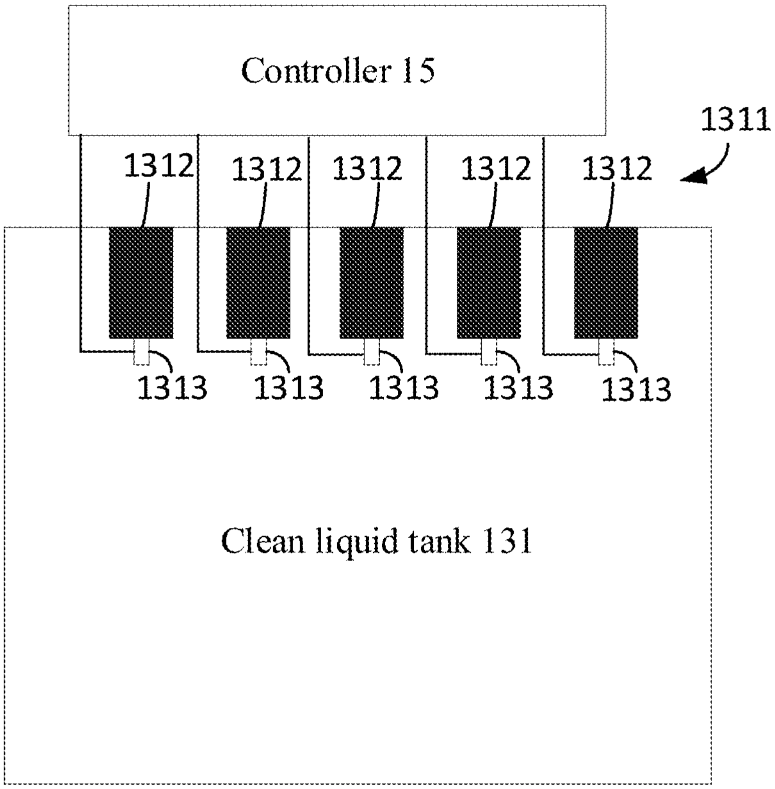
FIG. 4 is a schematic view showing a plurality of detergent units provided in a clean liquid box shown in FIG. 3.

In some embodiments, referring to FIG. 4, a plurality of detergent units 1311 respectively used for storing various types of detergents are arranged inside the clear liquid tank 131. Each detergent unit 1311 includes a detergent bottle 1312 and a cleaning solenoid valve 1313, and the acid-base properties of detergents respectively stored in different detergent bottles 1312 may be different. Each detergent bottle 1312 is arranged at the top of the clear liquid tank 131, and the bottle mouth of each detergent bottle 1312 faces the bottom part of the clear liquid tank 131. The cleaning solenoid valve 1313 is arranged at the bottle mouth of the detergent bottle 1312 and is further electrically connected with the controller 15. When the controller 15 controls the cleaning solenoid valve 1313 to work in an open state, the cleaning liquid stored in the detergent bottle 1312 drops on the clean water of the clear liquid tank 131 by gravity, thus mixing with the clean water to form cleaning liquid. When the controller 15 controls the cleaning solenoid valve 1313 to work in a closed state, the cleaning liquid stored in the detergent bottle 1312 is blocked from falling into the clear liquid tank 131.

When the cleaning solenoid valve 1313 is in the open state, as the cleaning solenoid valve 1313 is opened for a longer time, more detergent will fall into the clean water tank 131, and the concentration of cleaning liquid formed by mixing the detergent with the clear water will be higher. Similarly, the less the amount of detergent falling into the clean water tank 131 is, the lower the concentration of the cleaning liquid formed by mixing the detergent with the clear water will be.

Figure 5:
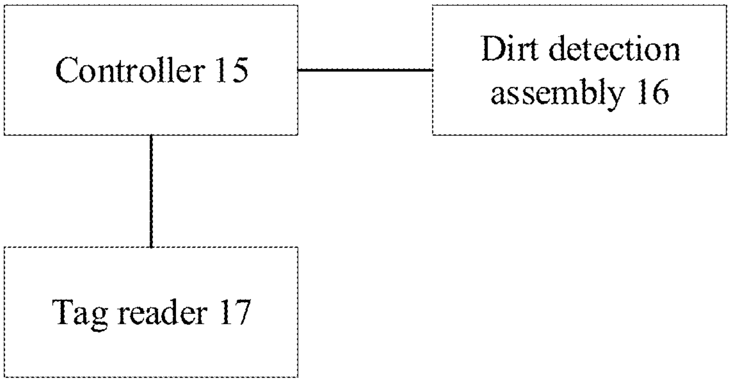
FIG. 5 is a block diagram illustrating circuit principle of a maintenance station provided by an embodiment of the present disclosure.

In some embodiments, referring to FIG. 5, the maintenance station 100 further includes a dirt detection assembly 16, which is electrically connected with the controller 15 and is used for detecting dirt information of the mop.

In some embodiments, the dirt detection assembly 16 includes an ultrasonic transceiver, which is arranged on the inner side wall of the accommodating cavity of the maintenance station and electrically connected with the controller 15 and is used for detecting the dirt information of the mop.

Usually, if the dirty degree of the mop is different, then the intensity of the ultrasonic signal reflected by the mop will be different. When the dirty degree of the mop is higher, garbage or caked dust will reflect most ultrasonic signals back to the ultrasonic transceiver. When the dirty degree of the mop is moderate, the mop will only reflect few ultrasonic signals back to the ultrasonic transceiver.

Therefore, the ultrasonic transceiver obtains the dirt information of the mop 21 according to a transmitted ultrasonic signal intensity L1 and a received ultrasonic signal intensity L2, so as to determine the dirty degree of the mop 21. For example, the ultrasonic transceiver divides the received ultrasonic signal intensity L2 by the transmitted ultrasonic signal intensity L1 to obtain a ratio, and when the ratio is in the range of 80%-100%, the dirt information is highest dirty degree information. When the ratio is in the range of 60%-80%, the dirt information is higher dirty degree information. When the ratio is in the range of 40%-60%, the dirt information is high dirty degree information. When the ratio is in the range of 20%-40%, the dirt information is medium dirty degree information. When the ratio is less than 20%, the dirt information is low dirty degree information.

Therefore, when using ultrasonic to detect the dirty degree of the mop, on the one hand, the detection logic is simple and the installation difficulty is lower, thus reducing the development difficulty, and on the other hand, as compared to other detection methods, the ultrasonic detection method has lower cost and is beneficial to popularization.

In some embodiments, the cleaning robot includes a tag that contains any suitable type of information associated with the cleaning robot. For example, the tag contains mop material information and/or equipment information of the cleaning robot.

Still referring to FIG. 5, the maintenance station 100 further includes a tag reader 17, which is electrically connected with the controller 15. The tag reader 14 is installed in the housing 11 and is used for reading information of the tag, wherein the installation position of the tag reader 17 may be selected according to the type of the tag. For example, if the tag is arranged on the bottom part wall, side wall or top wall of the cleaning robot, then the tag reader 17 of the maintenance station 100 may correspondingly be arranged at one side of the corresponding tag setting position in the maintenance station 100, thereby providing a detection range of the tag reader 17 to cover the tag and read the tag information of the tag.

As another example, when the tag is arranged on the mop, the tag may be connected at the edge of the mop or directly integrated with the mop, and the tag reader 17 of the maintenance station 100 may correspondingly be arranged at the bottom part of the maintenance station 100 and face upwards to provide a detection range of the tag reader 17 to cover the tag. Since the tag information of the tag may be changed along with the change of the mop, the tag information of the tag binding with the type information of the mop may be realized, which is convenient for the maintenance station 100 to clean the mop reliably and effectively.

As mentioned above, the tag described herein may be of any suitable type. In order to facilitate the installation of the tag reader 17 and improve the convenience and accuracy of reading the tag, in some embodiments, the tag is an RFID tag, and the tag reader 17 is installed at the maintenance station 100. For example, the tag reader 17 is installed at the bottom part of the maintenance station 100. Since the reading distance of the RFID tag may reach at least 10 cm and the position of the RFID tag in the cleaning robot is not limited, the tag reader 17 may read the tag information of the tag whenever the cleaning robot carries the mop and moves into the accommodating cavity. Therefore, using the RFID tag as the tag is beneficial for the arrangement of the tag in the cleaning robot on the one hand, and is beneficial for the arrangement of the tag reader 17 in the maintenance station 100 on the other hand, so as to make preparation for reliable and simple detection of tag information under the condition of the relatively narrow space in the accommodation cavity itself.

In some embodiments, the tag reader 17 includes a reading antenna, a tag reading circuit and a power supply module, wherein the tag reading circuit is connected with the reading antenna and the power supply module, and the reading antenna may be arranged in the body of the machine. When the cleaning robot carries the mop assembly and moves into the accommodation cavity, the tag reading circuit reads tag information of the tag through the reading antenna.

Figure 6:
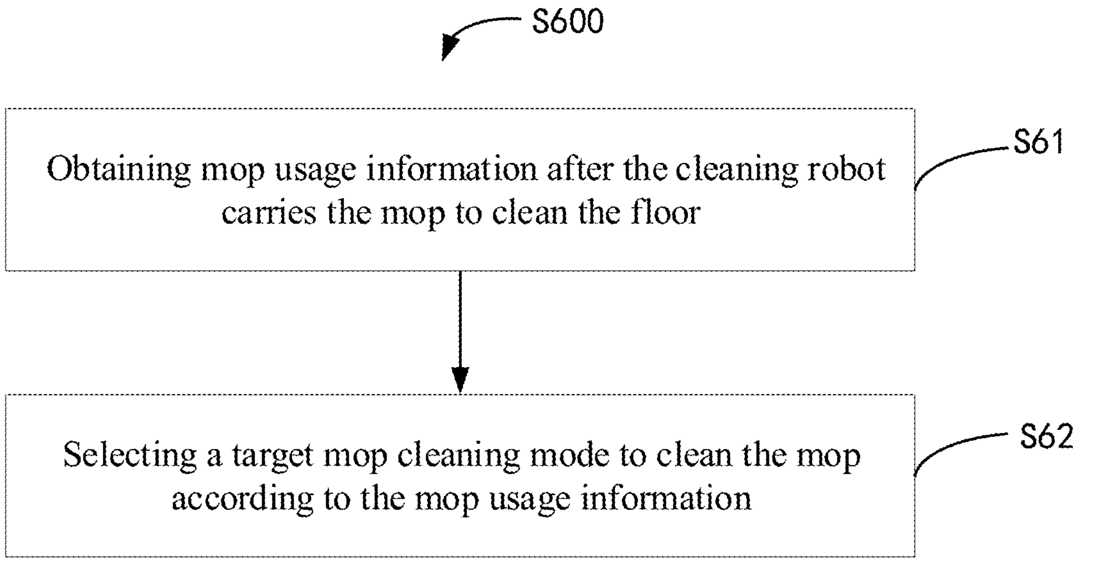
FIG. 6 is a schematic flowchart diagram of a method for cleaning the mop of a cleaning robot provided by an embodiment of the present disclosure.

As another aspect of the embodiment of the present disclosure, the embodiment of the present disclosure provides a method for cleaning the mop of a cleaning robot. Referring to FIG. 6, the mop cleaning method S600 for the cleaning robot includes:

S61. obtaining mop usage information after the cleaning robot carries the mop to clean the floor.

In this embodiment, the mop usage information is information associated with cleaning the floor with the mop. For example, the mop usage information includes at least one of mop material information, mop scene information and mop dirty degree information. The mop material information is material information that indicates various soft and hard mop specifications, and it includes soft mop material information and hard mop material information. The division and definition of the soft and hard degree of materials may be user defined. For example, the soft mop material information includes superfine fiber material or sliver material, and the hard mop material information includes polyvinyl alcohol collodion material or the like.

The mop scene information refers to the functional type information of the area where the mop performs cleaning operations. For example, if the mop performs cleaning operations in the bedroom, then the mop scene information is bedroom scene information. Alternatively, if the mop performs cleaning operations in the kitchen, then the mop scene information is kitchen scene information. Alternatively, if the mop performs cleaning operations in the living room, then the mop scene information is living room scene information. Obviously, the functional types of areas of bedroom, kitchen and living room are different. When setting the mop scene information of the cleaning robot, the user may set the mop scene information of the cleaning robot on the APP client of the mobile terminal, the mobile terminal sends the mop scene information to the cleaning robot, and the cleaning robot sends the mop scene information to the maintenance station. Alternatively, the mobile terminal directly sends the mop scene information to the maintenance station and the cleaning robot.

It shall be appreciated that, the user may set a plurality of pieces of scene information indicating that the cleaning robot needs to continuously perform mopping operations on the APP client. For example, the cleaning robot needs to perform mopping operations in the sequence of bedroom-living room-kitchen. In some embodiments, when the cleaning robot receives the mop scene information, it plans the mopping area according to the mop scene information. The mopping area corresponding to the bedroom scene information is larger than the mopping area corresponding to the living room scene information, and the mopping area corresponding to the living room scene information is larger than the mopping area corresponding to the kitchen scene information. With such planning, the mopping efficiency and mopping effect can be improved.

The mop dirty degree information indicates the dirty degree of the mop. For example, the mop dirty degree information includes highest dirty degree information, higher dirty degree information, high dirty degree information, medium dirty degree information or low dirty degree information. The dirty degree of the mop may be measured by any suitable method. As mentioned above, the maintenance station may measure the dirty degree of the mop by using an ultrasonic transceiver, and the dirty degree may be a ratio of the received ultrasonic signal strength to the transmitted ultrasonic signal strength. It shall be appreciated that, those skilled in the art may also select appropriate mop usage information to clean the mop according to the contents disclosed in this embodiment.

S62. selecting a target mop cleaning mode to clean the mop according to the mop usage information.

In this embodiment, the mop cleaning mode is used to instruct the maintenance station to clean the mop according to mop cleaning parameters under the mop cleaning mode. This embodiment provides a variety of mop cleaning modes for the maintenance station to choose, and the target mop cleaning mode is one of the various mop cleaning modes. Under the instruction of different mop usage information, the maintenance station selects an proper mop cleaning mode as the target mop cleaning mode, thereby effectively cleaning the mop and improving the service life or cleaning efficiency of the mop.

Generally speaking, different from the prior art in which a fixed mop cleaning mode is adopted, the maintenance station related to this embodiment can flexibly select the target mop cleaning mode to clean the mop according to the mop usage information when the mop usage information change, which is helpful to improve the effect of cleaning the mop. Moreover, the maintenance station related to this embodiment can also clean mops of various material types or mops with various dirty degrees, and improve the coverage of mop cleaning.

Figure 7:
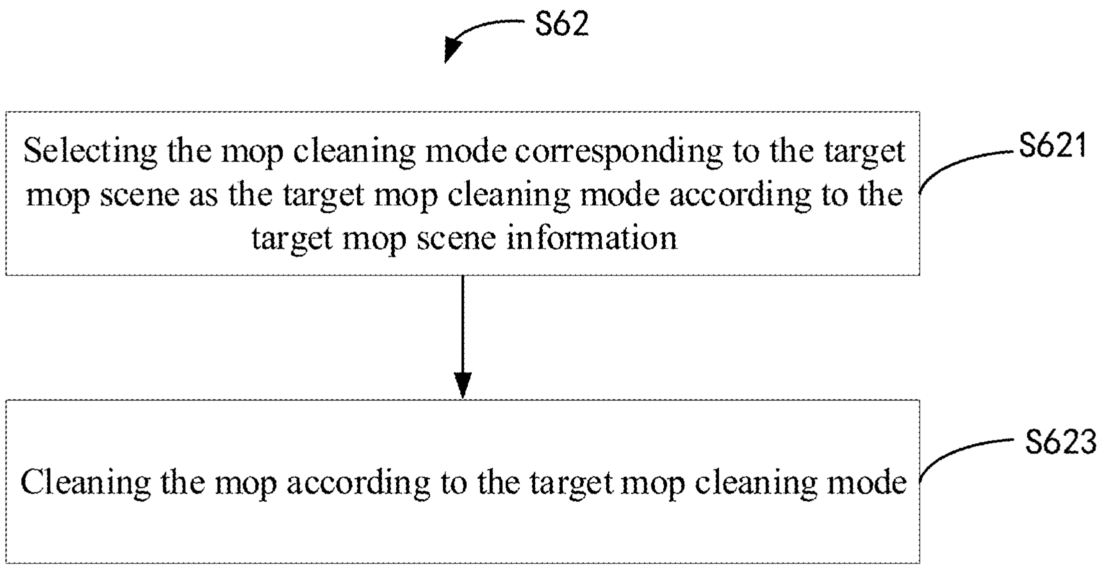
FIG. 7 is a schematic flowchart diagram of S62 shown in FIG. 6.

In some embodiments, the mop usage information is the target mop scene information. Referring to FIG. 7, S62 includes:

S621. according to the target mop scene information, selecting the mop cleaning mode corresponding to the target mop scene as the target mop cleaning modescene;

S623. cleaning the mop according to the target mop cleaning mode.

For example, the mop cleaning modes include a low-level mop cleaning mode, a middle-level mop cleaning mode or a high-level mop cleaning mode. Different mop cleaning modes correspond to different cleaning parameters. The higher the level of the mop cleaning mode is, the stronger the cleaning strength, cleaning time, cleaning liquid concentration or detergent will be. Usually, the functional types of areas of bedroom, living room, balcony or kitchen are different, and the dirty degrees of the floor of the areas are also different.

Generally speaking, the dirty degree of the bedroom is less than the dirty degree of the living room, the dirty degree of the living room is less than the dirty degree of the balcony, and the dirty degree of the balcony is less than the dirty degree of the kitchen. Therefore, if the mop scene information is the bedroom scene information, then the mop cleaning mode is the low-level mop cleaning mode. If the mop scene information is the living room scene or the balcony scene information, then the mop cleaning mode is the middle-level mop cleaning mode. If the mop scene information is the kitchen scene information, then the mop cleaning mode is the high-level mop cleaning mode.

In this embodiment, the target mop scene is the latest scene of the cleaning robot when it carries the mop and returns to the maintenance station. For example, when the user instructs the cleaning robot to perform mopping operations in the sequence of bedroom-living room-kitchen through the mobile terminal, after the cleaning robot finishes the mopping operation on the bedroom, it needs to return to the maintenance station to clean the mop. At this time, the bedroom scene information is the target mop scene. Then, after the cleaning robot finishes the mopping operation on the kitchen, it needs to return to the maintenance station to clean the mop. At this time, the kitchen scene information is the target mop scene.

In this embodiment, the maintenance station extracts the target mop scene information by analyzing the mop usage information. For example, when the target mop scene information is the bedroom scene information and the low-level mop cleaning mode is the target mop cleaning mode, the maintenance station may clean the mop according to the low-level mop cleaning mode. This practice may shorten the cleaning time while ensuring that the mop is cleaned well, and this is beneficial for the cleaning robot to quickly switch to the next scene for mopping operation.

When the target mop scene information is the living room or balcony scene information, the middle-level mop cleaning mode is the target mop cleaning mode.

When the target mop scene information is the kitchen scene information and the high-level mop cleaning mode is the target mop cleaning mode, the maintenance station may clean the mop according to the high-level mop cleaning mode. This practice can reliably clean the mop well and avoid secondary pollution when the cleaning robot switches to the next scene for mopping operation.

Generally speaking, by adopting this method, the proper mop cleaning mode can be individually selected to clean the mop according to the mop working environment of the cleaning robot, thus improving the effect and efficiency of cleaning the mop.

Figure 8A:
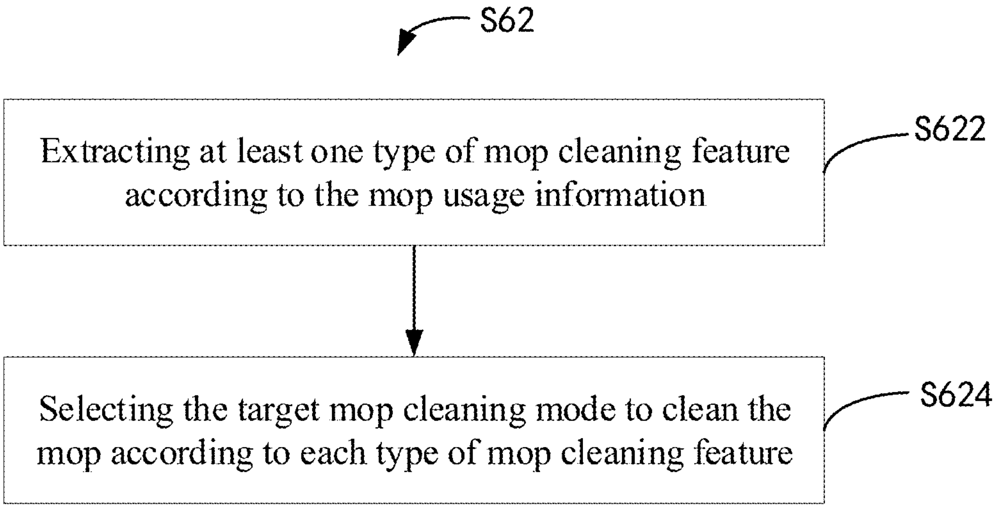
FIG. 8*a* is another schematic flowchart diagram of S62 shown in FIG. 6.

Different from the above embodiments, since the mop usage information may contain multi-dimensional information associated with the mop, the maintenance station may comprehensively select the proper mop cleaning mode to clean the mop in multiple dimensions. Therefore, in some embodiments, referring to FIG. 8*a*, S62 includes:

S622. extracting at least one type of mop cleaning feature according to the mop usage information;

S624. selecting the target mop cleaning mode to clean the mop according to each of the at least one type of mop cleaning feature.

In this embodiment, as mentioned above, the mop usage information may include multi-dimensional information associated with the mop, and each type of mop usage information has corresponding mop cleaning feature. For example, the mop usage information includes at least one of target mop scene information, mop material information and dirty degree information. When the mop usage information includes the target mop scene information, the maintenance station extracts the target mop scene feature according to the target mop scene information. For example, if the target mop scene information is the bedroom scene information, then the target mop scene feature is the bedroom scene feature. If the target mop scene information is the kitchen scene information, then the target mop scene feature is the kitchen scene feature, and so on, and this will not be further described herein.

When the mop usage information includes mop material information, the maintenance station extracts the mop material feature according to mop material information. For example, if the mop material information is the soft mop material information, then the mop material feature is the soft mop material feature. If the mop material information is the hard mop material information, then the mop material feature is the hard mop material feature.

When the mop usage information includes mop dirty degree information, the maintenance station extracts the dirty degree feature according to the dirty degree information. For example, if the mop dirty degree information is the highest dirty degree information, then the dirty degree feature is the highest dirty degree feature. If the mop dirty degree information is higher dirty degree information, then the dirty degree feature is the higher dirty degree feature, and so on, and this will not be further described herein.

By comprehensively considering each type of mop cleaning feature under different mop usage information in multiple dimensions, the maintenance station related to this embodiment can select the target mop cleaning mode more reliably and comprehensively to clean the mop.

Figure 8B:
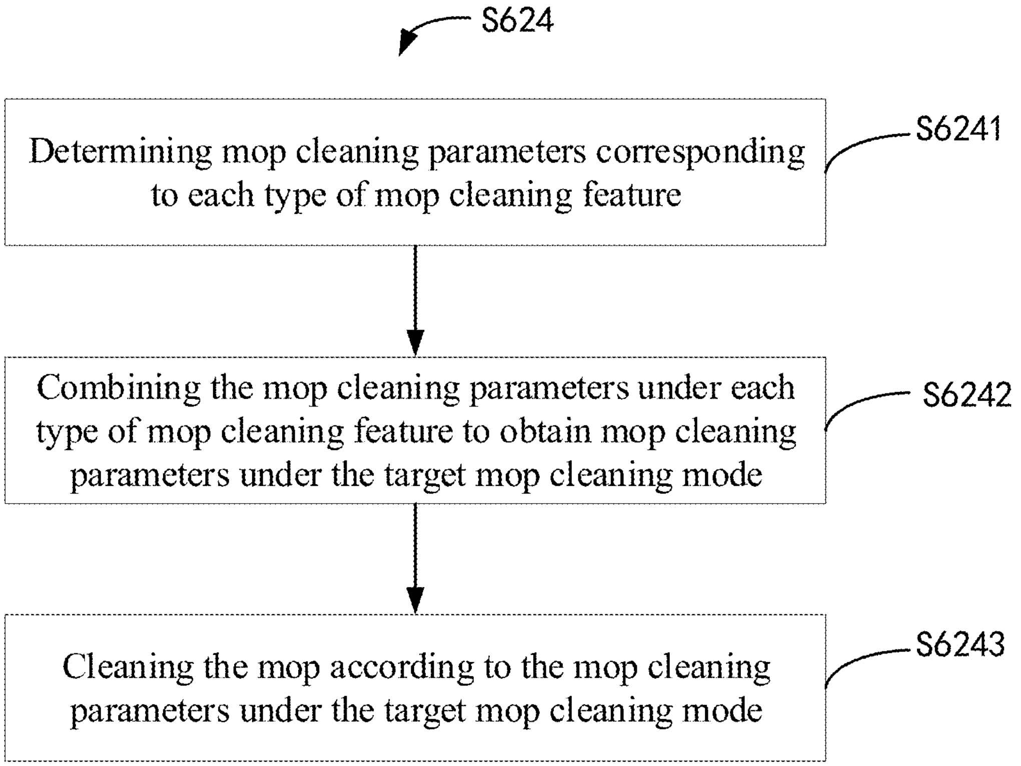
FIG. 8*b* is a schematic flowchart diagram of S624 shown in FIG. 8*a*.

In some embodiments, referring to FIG. 8*b*, S624 includes:

- S6241. determining mop cleaning parameters corresponding to each type of mop cleaning feature;
- S6242. combining the mop cleaning parameters under each type of mop cleaning feature to obtain mop cleaning parameters under the target mop cleaning mode;
- S6243. cleaning the mop according to the mop cleaning parameters under the target mop cleaning mode.

In some embodiments, the mop cleaning parameters include at least one of cleaning strength, detergent type, detergent concentration and mop cleaning time.

When the mop cleaning feature is the mop material feature, the cleaning strength and/or detergent corresponding to each type of mop material feature are determined. When the mop cleaning feature is the dirty degree feature, the detergent concentration and/or mop cleaning time corresponding to each type of dirty degree feature are determined.

The cleaning strength refers to the water spraying velocity or the rotating velocity of the rotator rubbing against the mop when the maintenance station cleans the mop. The greater the velocity is, the greater the cleaning strength will be; and the smaller the velocity is, the smaller the cleaning strength will be.

In some embodiments, when the mop cleaning feature is the hard mop material feature, the first cleaning strength is selected, and when the mop cleaning feature is the soft mop material feature, the second cleaning strength is selected, and the first cleaning strength is greater than the second cleaning strength. For example, when the mop is a hard material mop, the maintenance station selects a water spraying velocity of 20 ml/s as the first cleaning strength to clean the mop. In this way, since the hard material mop is not easily damaged by fast moving water, and the garbage of the mop can be washed away relatively quickly by the fast-moving water, the method can improve the efficiency of cleaning the mop without damaging the mop. When the mop is a soft material mop, the maintenance station selects a water spraying velocity of 10 ml/s as the second cleaning strength to clean the mop. Since the soft material mop is likely to be damaged by fast moving water, by adopting this method, the mop can be effectively cleaned under the condition of protecting the mop from being damaged, thereby improving the service life of the mop.

In this embodiment, referring to FIG. 3, the controller achieves the purpose of adjusting the cleaning strength by adjusting the working power of the water pump.

The detergents herein are detergents having specific chemical components, and different detergents may be changed into cleaning liquid with different acidity and alkalinity. The detergents include acidic detergents or alkaline detergents. Acidic detergents may be divided into detergents with different acidity and alkaline detergents may be divided into detergents with different alkalinity. Different cleaning liquids used to clean the mop may differ in cleaning performance and cleaning efficiency, and cleaning liquids with different acidity and alkalinity may differ in corrosiveness or damage on mops of different materials.

In order to both obtain the cleaning efficiency and protect the mop from being damaged by improper selection of detergents, in some embodiments, in the acid/alkaline range, when the mop cleaning feature is the hard mop material feature, a strong acid/alkaline detergent is selected; and when the mop cleaning feature is the soft mop material feature, a weak acid/alkali detergent is selected.

In some embodiments, for the acid/alkaline range, there may be at least two types of acid/alkaline detergents. For example, in the acidic range, there are strong acidic and weak acidic detergents. In the alkaline range, there are strong alkaline and weak alkaline detergents.

For example, in the alkaline range, when the mop is a hard material mop, the maintenance station selects an alkaline detergent with a pH value of 10. When the mop is a soft material mop, the maintenance station selects an alkaline detergent with a pH value of 8.

For another example, in the acidic range, when the mop is a hard material mop, the maintenance station selects an acidic detergent with a pH value of 6. When the mop is a soft material mop, the maintenance station selects an acidic detergent with a pH value of 7.

Generally speaking, the higher the alkalinity or acidity is, the higher the efficiency of cleaning the mop by the maintenance station will be. Therefore, this method can improve the efficiency of cleaning the mop as much as possible without damaging the mop.

In some embodiments, the acidic detergents include citric acid, acetic acid, hydrochloric acid diluent, sodium sulfate, oxalic acid, toilet detergent, disinfectant or hydrogen peroxide bleach. The alkaline detergents include calcium bicarbonate, sodium carbonate, sodium hydroxide, ammonia water, sodium hypochlorite bleach, sodium perborate bleach, glass detergent, furniture wax or waxing water.

In some embodiments, detergents with different acidity and alkalinity have different effects on the area, and the acidic detergent may be used for sterilization. As for the alkaline detergent, it may effectively remove greasy stains.

Generally speaking, for the bedroom, the acidic detergent may be preferred, and the binding may be customized by the user. For the kitchen, alkaline detergents may be preferred, and of course, acidic detergents may also be considered. For the toilet, acid detergents may be preferred. For the living room, acid detergent may be preferred. The above settings may be self-defined by the user, and the user may customize the binding of the mop scene and the detergent type in the APP client of the mobile terminal.

In this embodiment, referring to FIG. 4, as mentioned above, after the controller obtains the target mop scene information, it may choose to open or close the detergent bottle storing the corresponding type of detergent to ensure that the cleaning liquid is acidic or alkaline.

In some embodiments, the maintenance station extracts the target mop scene features according to the target mop scene information, and determines the acid/alkaline range according to the target mop scene features. For example, if the target mop scene information is the bedroom scene information, and the target mop scene feature is the bedroom scene feature, the maintenance station selects the acid range. If the target mop scene information is the kitchen scene information, and the target mop scene feature is the kitchen scene feature, the maintenance station selects the alkaline range. Therefore, by adopting this method, the mop can be cleaned reliably for various mop scenes while achieving purposes of both improving the mop cleaning efficiency and protecting the mop.

The concentration of the detergent is the content percentage of detergent in unit volume of cleaning liquid. Generally, under other equivalent conditions, the higher the concentration of the detergent is, the easier it will be to clean the mop well.

When the mop cleaning feature is the highest dirty degree feature, the highest detergent concentration is selected. For example, in this embodiment, it is set that a detergent concentration of 60% is the highest detergent concentration, and the higher dirty degree feature corresponds to the higher detergent concentration of 50%, the high dirty degree feature corresponds to a detergent concentration of 40%, the medium dirty degree feature corresponds to a detergent concentration of 30%, and the low dirty degree feature corresponds to a detergent concentration of 10%. When the mop cleaning feature is the higher dirty degree feature, a higher detergent concentration is selected, and so on.

In this embodiment, referring to FIG. 4, as mentioned above, after the controller selects the detergent bottle of corresponding detergent type and ensures that the cleaning liquid is acidic or alkaline, the controller controls the opening time of the detergent bottle of corresponding detergent type, thereby achieving the purpose of adjusting the concentration of the detergent.

The mop cleaning time is the time required by the maintenance station to clean the mop. Generally speaking, the longer the mop cleaning time is, the higher the cleaning degree of the mop will be. The shorter the mop cleaning time is, the lower the cleaning degree of the mop will be.

The maximum mop cleaning time is selected when the mop cleaning feature is the highest dirty degree feature. For example, it is set in this embodiment that a mop cleaning time of 20 minutes is the maximum mop cleaning time, and the higher dirty degree feature corresponds to a larger mop cleaning time of 15 minutes, the high dirty degree feature corresponds to a mop cleaning time of 10 minutes, the medium dirty degree feature corresponds to a mop cleaning time of 5 minutes, and the low dirty degree feature corresponds to a mop cleaning time of 3 minutes. When the mop cleaning feature is the higher dirty degree feature, a larger mop cleaning time is selected, and so on.

In this embodiment, referring to FIG. 3, the controller achieves the purpose of adjusting the mop cleaning time by controlling the working time of the water pump and the solenoid valve.

After the maintenance station determines mop cleaning parameters corresponding to each type of mop cleaning feature, the mop cleaning parameters under each type of mop cleaning feature can be combined to obtain mop cleaning parameters under the target mop cleaning mode.

In the first group, it is assumed that the mop material information of the cleaning robot is the hard mop material information, the mop scene information is the bedroom scene information, and the dirty degree information is the low dirty degree information. Referring to Table 1:

TABLE 1

| | Hard mop material information | Bedroom scene information | Low dirty degree information |
|---|---|---|---|
| Cleaning strength | First cleaning strength | X | X |
| Acid/alkaline range | X | Acid | X |
| Detergent | Strong acidic detergent | X | X |
| Detergent concentration | X | X | 10% |
| Cleaning time of mop | X | X | 3 minutes |

In the second group, it is assumed that the mop material information of the cleaning robot is the soft mop material information, the mop scene information is the kitchen scene information, and the dirty degree information is the high dirty degree information. Referring to Table 2:

TABLE 2

| | Soft mop material information | Kitchen scene information | High dirty degree information |
|---|---|---|---|
| Cleaning strength | Second cleaning strength | X | X |
| Acid/alkaline range | X | Alkaline | X |
| Detergent | Weak alkaline detergent | X | X |
| Detergent concentration | X | X | 30% |
| Cleaning time of mop | X | X | 10 minutes |

As can be seen from Table 1 or Table 2, in the first group, the maintenance station may clean the mop according to the following cleaning parameters {First cleaning strength, Strong acid detergent, 10%, 3 minutes}. In the second group, the maintenance station may clean the mop according to the following cleaning parameters {Second cleaning strength, Weak alkaline detergent, 30%, 10 minutes}. Therefore, the proper mop cleaning mode is selected by comprehensively considering various factors from multiple dimensions, thereby achieving purposes of both improving the mop cleaning efficiency and increasing the service life of the mop.

It should be noted that, in each of the above embodiments, the above steps are not necessarily executed in a certain order. According to the description of the embodiments of the present disclosure, those of ordinary skill in the art may understand that in different embodiments, the above steps may be executed in different orders. That is, these steps may be executed in parallel or the steps may be exchanged for execution, and so on.

Figure 9:
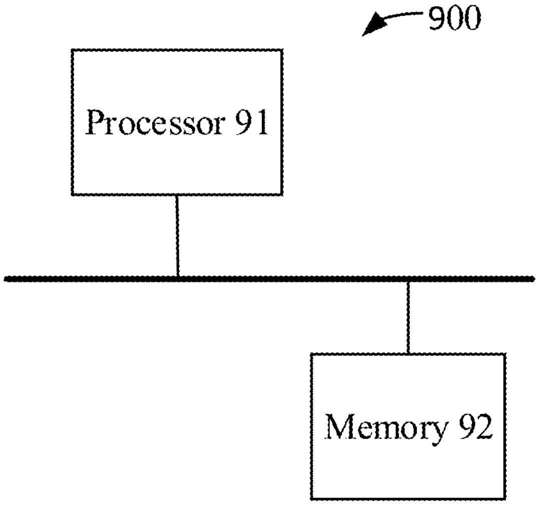
FIG. 9 is a block diagram illustrating circuit principle of an electronic device provided by an embodiment of the present disclosure.

Please refer to FIG. 9, which is a block diagram illustrating circuit principle of an electronic device provided by an embodiment of the present disclosure, wherein the electronic device may be any suitable electronic product such as a maintenance station. As shown in FIG. 9, an electronic device 900 includes one or more processors 91 and a memory 92. In FIG. 9, one processor 91 is taken as an example.

The processor 91 and the memory 92 may be connected by a bus or other means, and the connection achieved by a bus is taken as an example in FIG. 9.

As a nonvolatile computer readable storage medium, the memory 92 may be used to store nonvolatile software programs, nonvolatile computer executable programs and modules, such as program instructions/modules corresponding to the knife state monitoring method in the embodiment of the present disclosure. The processor 91 achieves the function of the method for cleaning the mop of a cleaning robot provided by the above embodiments of the method by running nonvolatile software programs, instructions and modules stored in the memory 92.

The memory 92 may include a high-speed random access memory, and may also include a nonvolatile memory, such as at least one magnetic disk memory device, flash memory device, or other nonvolatile solid-state memory device. In some embodiments, the memory 92 optionally includes memories remotely located relative to the processor 91, and these remote memories may be connected to the processor 91 through a network. Examples of the above network include but are not limited to the Internet, Intranet, local area networks, mobile communication networks and combinations thereof.

The program instructions/modules are stored in the memory 92, and when executed by the one or more processors 91, execute the mop cleaning method for the cleaning robot in any of the above embodiments of the method.

The embodiments of the present disclosure also provide a nonvolatile computer storage medium, in which computer executable instructions are stored. The computer executable instructions, when executed by one or more processors, e.g., a processor 91 in FIG. 9, cause the one or more processors to execute the mop cleaning method for the cleaning robot in any of the above embodiments of the method.

The embodiments of the present disclosure also provide a computer program product, which includes a computer program stored on a nonvolatile computer readable storage medium, and the computer program includes program instructions. The program instructions, when executed by an electronic device, cause the electronic device to execute any of the mop cleaning methods for the cleaning robot.

The embodiments of the above-described devices or equipments are only schematic. The unit modules described as separate components may or may not be physically separated, and components displayed as module units may or may not be physical units, that is, they may be located in one place or distributed over multiple network module units. Some or all of the modules may be selected according to actual needs to achieve the purpose of this embodiment.

From the description of the above embodiments, those skilled in the art may clearly understand that each embodiment may be realized by means of software plus a general hardware platform, and of course, it may also be realized by hardware. Based on such understanding, the essence of the above technical solution or the part that contributes to related technologies may be embodied in the form of software products. The computer software products may be stored in computer-readable storage media, such as a ROM/RAM, a magnetic disk, an optical disk or the like, and they include several instructions to make a computer device (which may be a personal computer, a server, or a network device, etc.) execute the method described in various embodiments or some parts of embodiments.

Finally, it shall be noted that, the above embodiments are only used to illustrate the technical solution of the present disclosure, but not to limit the present disclosure. Under the idea of the present disclosure, technical features in the above embodiments or different embodiments may also be combined, the steps may be realized in any order, and many other variations in different aspects of the present disclosure as described above are possible, and these variations are not provided in details for conciseness. Although the present disclosure has been described in detail with reference to the foregoing embodiments, those of ordinary skill in the art shall appreciate that, the technical solutions described in the foregoing embodiments may still be modified or some of the technical features may be equivalently replaced. These modifications or substitutions do not make the essence of the corresponding technical solutions deviate from the scope of the technical solutions of various embodiment of the present disclosure.

What is claimed is:

1. A method for cleaning a mop of a cleaning robot, applied to a maintenance station, the method comprising:

the maintenance station obtaining mop usage information from the cleaning robot after the cleaning robot carries the mop to clean the floor, wherein the mop usage information comprises target mop scene information;

the maintenance station extracting at least one type of mop cleaning feature according to the mop usage information;

the maintenance station determining mop cleaning parameters corresponding to each of the at least one type of mop cleaning feature, the mop cleaning parameters comprising cleaning strength, detergent, detergent concentration and mop cleaning time;

the maintenance station combining the mop cleaning parameters corresponding to each of the at least one type of mop cleaning feature to obtain the mop cleaning parameters under a target mop cleaning mode; and the maintenance station cleaning the mop according to the mop cleaning parameters under the target mop cleaning mode;

wherein the at least one type of mop cleaning feature comprises a mop material feature, the mop material feature comprises a hard mop material feature and a soft mop material feature, the maintenance station determining mop cleaning parameters corresponding to each of the at least one type of mop cleaning feature comprises: the maintenance station determining the detergent corresponding to the mop material feature, and the maintenance station determining the detergent corresponding to the mop material feature comprises:

extracting a target mop scene feature according to the target mop scene information;

determining an acid/alkaline range according to the target mop scene feature;

selecting a strong acid/alkaline detergent in the acid/alkaline range when the mop material feature is the hard mop material feature; and selecting a weak acid/alkali detergent in the acid/alkaline range when the mop material feature is the soft mop material feature.

2. The method of claim 1, wherein the at least one type of mop cleaning feature comprises a dirty degree feature, and the maintenance station determining mop cleaning parameters corresponding to each of the at least one type of mop cleaning feature comprises:

the maintenance station determining the cleaning strength corresponding to the mop material feature; and the maintenance station determining the detergent concentration and/or the mop cleaning time corresponding to the dirty degree feature.

3. The method of claim 2, wherein the maintenance station determining the cleaning strength corresponding to the mop material feature comprises:

the maintenance station selecting a first cleaning strength when the mop material feature is the hard mop material feature; and the maintenance station selecting a second cleaning strength when the mop material feature is the soft mop material feature, wherein the first cleaning strength is greater than the second cleaning strength.

4. The method of claim 2, wherein the maintenance station defines an accommodating cavity, the maintenance station comprises a dirt detection assembly, the dirt detection assembly comprises an ultrasonic transceiver arranged on an inner side wall of the accommodating cavity;

the mop usage information comprises mop dirty degree information, the mop dirty degree information is obtained according to a transmitted ultrasonic signal intensity of an ultrasonic wave transmitted by the ultrasonic transceiver toward the mop and a received ultrasonic signal intensity of the ultrasonic wave reflected by the mop, and the mop dirty degree information is represented by a ratio of dividing the received ultrasonic signal intensity by the transmitted ultrasonic signal intensity; and the dirty degree feature is extracted according to the mop dirty degree information.

5. A maintenance station, comprising:

at least one processor; and a memory communicatively connected with the at least one processor; wherein the memory stores instructions capable of being executable by the at least one processor to enable the at least one processor to execute the method of claim 1.

6. A nonvolatile computer-readable storage medium storing executable instructions that, when executed by at least one processor causes a maintenance station to:

obtain mop usage information from a cleaning robot after the cleaning robot carries a mop to clean the floor, wherein the mop usage information comprises target mop scene information;

extract at least one type of mop cleaning feature according to the mop usage information;

determine mop cleaning parameters corresponding to each of the at least one type of mop cleaning feature, the mop cleaning parameters comprising cleaning strength, detergent, detergent concentration and mop cleaning time;

combine the mop cleaning parameters corresponding to each of the at least one type of mop cleaning feature to obtain the mop cleaning parameters under a target mop cleaning mode; and clean the mop according to the mop cleaning parameters under the target mop cleaning mode;

wherein the at least one type of mop cleaning feature comprises a mop material feature, the mop material feature comprises a hard mop material feature and a soft mop material feature, the determining mop cleaning parameters corresponding to each of the at least one type of mop cleaning feature comprises: determining the detergent corresponding to the mop material feature, and the determining the detergent corresponding to the mop material feature comprises:

extracting a target mop scene feature according to the target mop scene information;

determining an acid/alkaline range according to the target mop scene feature;

selecting a strong acid/alkaline detergent in the acid/alkaline range when the mop material feature is the hard mop material feature; and selecting a weak acid/alkali detergent in the acid/alkaline range when the mop material feature is the soft mop material feature.

* * * * *